US005609778A

United States Patent [19]
Pulaski et al.

[11] Patent Number: 5,609,778
[45] Date of Patent: Mar. 11, 1997

[54] PROCESS FOR HIGH CONTRAST MARKING ON SURFACES USING LASERS

[75] Inventors: Doris P. Pulaski, Holmes; Richard T. Anderson, Wappingers Falls; Christopher L. Tessler, Campbell Hall; Stephen J. Tirch, III, Poughkeepsie; Dawn J. Tudryn, Fishkill, all of N.Y.

[73] Assignee: International Business Machines Corporation, Armonk, N.Y.

[21] Appl. No.: 460,294

[22] Filed: Jun. 2, 1995

[51] Int. Cl.$^6$ .................................................. B23K 26/06
[52] U.S. Cl. ........................ 219/121.69; 219/121.75; 219/121.8; 219/121.85; 437/173; 347/258
[58] Field of Search .................. 219/121.68, 121.69, 219/121.7, 121.71, 121.73, 121.75, 121.8, 121.85, 121.6; 264/400; 359/205, 209; 437/173; 347/256, 258, 259, 260; 358/297

[56] References Cited

U.S. PATENT DOCUMENTS

| | | |
|---|---|---|
| 4,001,840 | 1/1977 | Becker et al. . |
| 4,079,230 | 3/1978 | Miyauchi et al. ................... 219/121.8 |
| 4,154,530 | 5/1979 | Connolly, Jr. et al. . |
| 4,353,617 | 10/1982 | Tokumitsu et al. . |
| 4,522,656 | 6/1985 | Kuhn-Kuhnenfeld et al. ......... 437/173 |
| 4,564,739 | 1/1986 | Mattelin . |
| 4,652,722 | 3/1987 | Stone et al. . |
| 4,725,709 | 2/1988 | Mattelin ............................... 219/121.8 |
| 4,758,703 | 7/1988 | Drever et al. ...................... 219/121.68 |
| 4,789,770 | 12/1988 | Kasner et al. ....................... 219/121.7 |
| 4,806,731 | 2/1989 | Bragard et al. .................... 219/121.69 |
| 4,923,772 | 5/1990 | Kirch et al. ............................... 430/5 |
| 4,940,881 | 7/1990 | Sheets ............................... 219/121.69 |
| 5,101,091 | 3/1992 | Grub et al. ......................... 219/121.74 |
| 5,103,073 | 4/1992 | Danilov et al. .................... 219/121.68 |
| 5,143,578 | 9/1992 | Luthi ................................. 219/121.68 |
| 5,175,425 | 12/1992 | Spratte et al. ........................... 347/224 |
| 5,206,496 | 4/1993 | Clement et al. ......................... 250/271 |
| 5,239,158 | 8/1993 | Locklear et al. ................... 219/121.69 |
| 5,247,883 | 9/1993 | Kuwahara et al. ..................... 101/170 |
| 5,293,265 | 3/1994 | Aleshin et al. ......................... 359/209 |
| 5,322,436 | 6/1994 | Horng et al. ............................. 433/23 |
| 5,484,980 | 1/1996 | Pratt et al. .......................... 219/121.8 |

FOREIGN PATENT DOCUMENTS

| | | |
|---|---|---|
| 0472-049-A2 | 2/1992 | European Pat. Off. . |
| 275425 | 1/1990 | German Dem. Rep. ......... 219/121.75 |
| 61-273283 | 12/1986 | Japan ............................... 219/121.75 |
| 92/09399 | 6/1992 | WIPO . |

OTHER PUBLICATIONS

Hansen, R. L., "Neodymium Yttrium Aluminum Garnet (Nd: YAG) Laser Marking System", SPIE vol. 247 Advances in Laser Engineering and Applications (1980), pp. 18–23.

Koller, et al., "Laser Marking of Plastic Components", Semiconductor International, Jun. 1991, p. 106.

U.S. Patent Application Serial No. 08/410,030, entitled "Single Metal Mask for Laser Ablation", filed on Mar. 24, 1995.

*Primary Examiner*—Teresa J. Walberg
*Assistant Examiner*—Gregory L. Mills
*Attorney, Agent, or Firm*—Aziz M. Ahsan

[57] ABSTRACT

A process for forming parabolic micro-reflectors on an object includes the steps of placing the object proximate to a transfer lens system, shining a laser beam through the lens system, a mask and a wobble plate and onto the object, the wobble plate wobbling the laser beam such that a parabolic shaped micro-reflector is formed on the object.

12 Claims, 1 Drawing Sheet

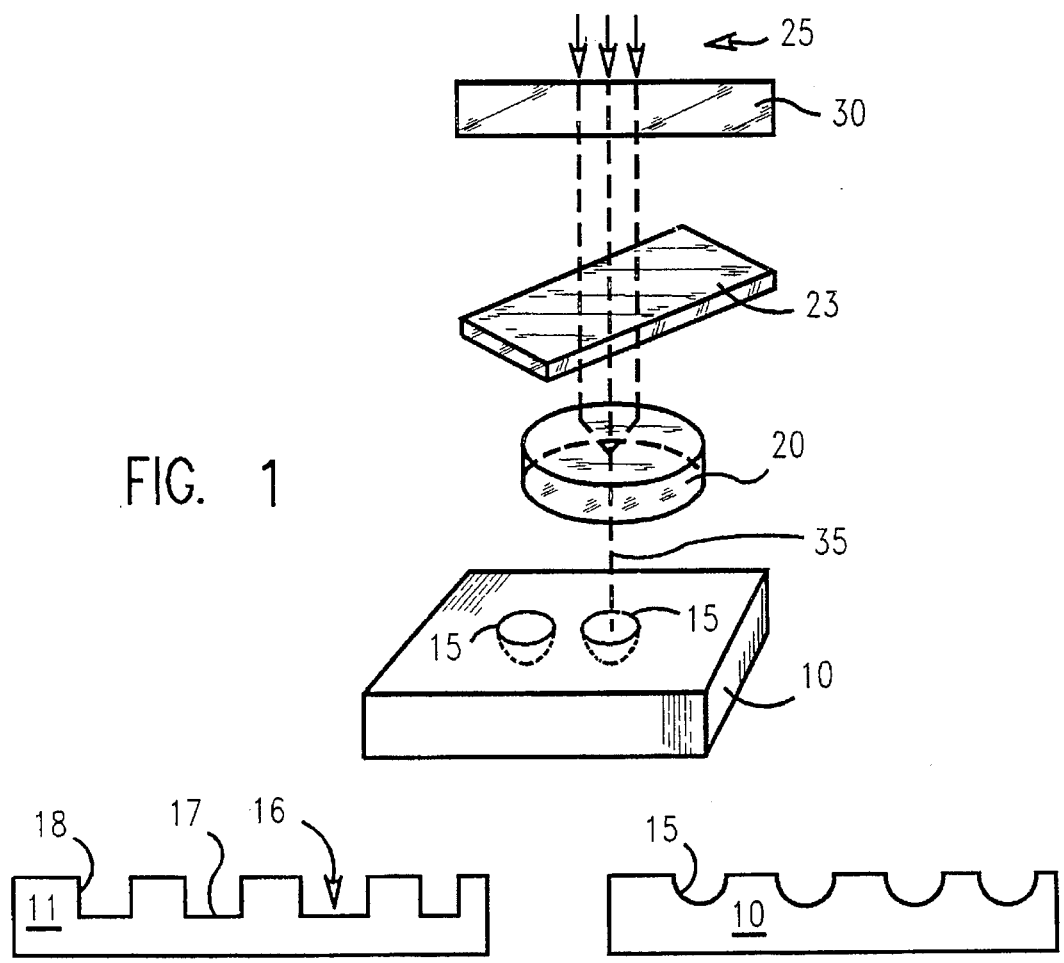
FIG. 1
FIG. 2 (Prior Art)
FIG. 3
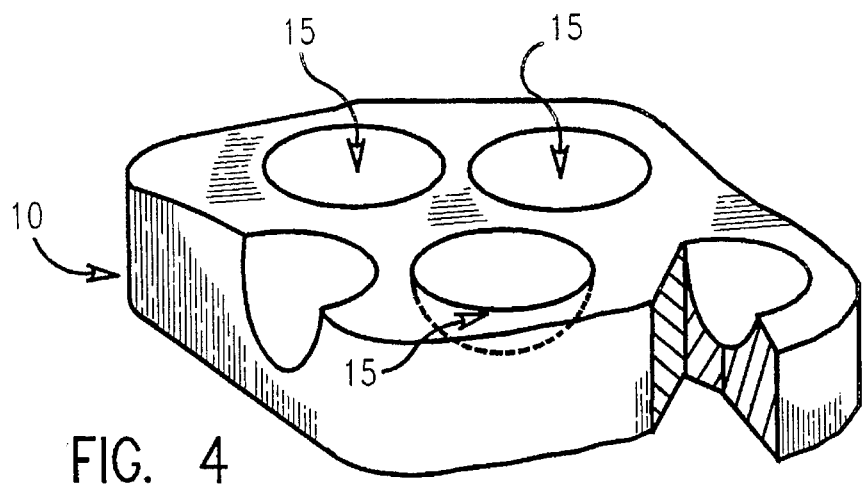
FIG. 4

PROCESS FOR HIGH CONTRAST MARKING ON SURFACES USING LASERS

CROSS-REFERENCE TO A RELATED PATENT APPLICATION

This Patent Application is related to U.S. patent application Ser. No. 08/460,286, entitled "APPARATUS FOR HIGH CONTRAST MARKING ON SURFACES USING LASERS", filed on Jun. 2, 1995, which is presently assigned to the assignee of the instant Patent Application and the disclosure of which is incorporated herein by reference.

FIELD OF THE INVENTION

The present invention relates generally to a new apparatus and process for high contrast marking on surfaces using lasers. More particularly, the invention encompasses an apparatus that makes high contrast marking on surfaces of parts using lasers. Basically, the high contrast marking results from the use of at least one wobble plate that creates at least one bowl shaped micro-reflector. A method for such high contrast marking on the surfaces of parts is also disclosed.

BACKGROUND OF THE INVENTION

For various reasons, it may be desirable to place a mark or a code on an object, such as an identification mark or code. Such a mark or code might be useful, for example, in identifying such articles if they are stolen, or for inventory control.

This marking could have specialized information, such as, words, insignias, logos, brand names, personalized signatures, date or batch codes, numbers, trademarks, company logos, and the like.

Another use of such a mark or code is in certain retail industries, such as the limited distribution cosmetic and fragrance industry. In such industries, distribution of products is limited to certain authorized retailers. However, it is known that some authorized dealers "divert" a portion of their stock to unauthorized dealers. Manufacturers therefore code each product package so that if it is diverted, the manufacturer can determine the identity of the authorized dealer who was the intended recipient of the package when it was shipped by the manufacturer. The manufacturer can then stop doing business with that dealer, or take other action against him.

Similarly, in other industries many products are packaged in transparent containers of glass or plastic and there has been a desire for many years to provide containers of this type with a method of marking such that once a mark has been applied, the mark cannot be easily removed. Such a method of marking would have obvious anti-counterfeiting applications but would also allow for the application of a code specific to each container and so would facilitate product tracking.

Laser marking of packages has been around for quite a few years. However, practical cost savings and environmental benefits are fully exercised when laser marking of packages is done in high-volume production processes.

$CO_2$ lasers have traditionally been the industry standard for laser marking. These lasers are primarily used for marking of plastic package surfaces, including Integrated Circuit package. In this process a laser beam is directed through a copper stencil to form the mark characters. However, advances in die shrinkage have led to smaller and more compact IC packages on which the quality and visibility of $CO_2$ markings is no longer adequate.

Yttrium aluminum garnet (YAG) laser markers have been seen as a possible alternative for marking. The YAG marking process works by steering the laser beam with a pair of X and Y galvanometers, controlled by software and hardware interfaces. Alphanumeric characters are scribed onto the package surface with the fine resolution and mark clarity needed for smaller plastic surface areas. A wide range of marking variables, such as depth, width and orientation can also be accommodated.

YAG lasers have also been used on ceramic packages, since the short wavelength of the laser easily penetrates the hard ceramic surface. The problem, however, has been that the YAG marking speeds are much slower than the $CO_2$ marking speeds, since the YAG laser movement is limited by software interfacing and the mechanical response time of the optics. Because of this, YAG lasers have not been commonly used for high-volume production.

European Patent Application No. 472,049 (UCC) discloses a method for engraving cells in a solid surface. An alternative basin shaped cell has a bottom relatively flat. This is achieved by using a pulsed laser beam which imparts a pattern of equidistant engraved cells, each of increased volume. The pulses of the laser beam are formed in a series of consecutive groups of two or more pulses. Each cell is produced by at least two consecutive spaced-apart pulses.

However, this invention relates to a method and an apparatus for encoding or marking of objects for identification purposes. More particularly, this invention relates to an apparatus and method for using a laser to place a microscopically or macroscopically visible mark or code on the surface of an object.

PURPOSES AND SUMMARY OF THE INVENTION

The invention is a novel process and an apparatus for providing a highly visible mark on a part using a laser beam.

Therefore, one purpose of this invention is to provide an apparatus and a process that will provide a highly visible mark on a part.

Another purpose of this invention is to be able to mark or encode objects in a way that the mark or code is easy to detect and read.

Another purpose of this invention is to be able to place the same mark or code in multiple and random locations on an object to further increase the possibility that all marks or codes will be detected.

Yet another purpose of this invention is to provide for marking with specialized information.

Still another purpose of this invention is to have a mark placed on an object using a laser.

Yet another purpose of this invention is to provide a method and apparatus for high-speed mark formation for small dimension marks.

Still yet another purpose of the invention is to allow the use of lasers, such as, YAG, $CO_2$, etc., for marking of parts.

Yet another purpose of this invention is to be able to penetrate only a portion of at least one protective coating on the part so as not to compromise the coating protection on the part.

Still another purpose of this invention is to mark an object with personalized information, such as, for example, insignia, brand name, logo mark, personalized signatures, date or date codes, batch codes, words, numbers, trademarks, and the like.

Therefore, in one aspect this invention comprises a process for forming micro-reflectors on an object, comprising the steps of:

(a) placing said object proximate to a transfer lens system, (b) shining a beam of laser light through a mask, and a wobble plate onto said object through said transfer lens system, (c) said wobble plate wobbling said beam of laser light such that a parabolic shaped micro-reflector is formed on said object, and thereby forming said micro-reflectors on said object.

In another aspect this invention comprises an apparatus for forming micro-reflectors on an object, comprising:

(a) a fixture to hold an object which is to be marked with micro-reflectors, (b) a transfer lens system, (c) a wobble plate, (d) a mask, and (e) a laser source transmitting a laser beam through said mask, said wobble plate and said transfer lens system onto the surface of said object, to form said micro-reflectors.

BRIEF DESCRIPTION OF THE DRAWINGS

The features of the invention believed to be novel and the elements characteristic of the invention are set forth with particularity in the appended claims. The drawings are for illustration purposes only and are not drawn to scale. Furthermore, like numbers represent like features in the drawings. The invention itself, however, both as to organization and method of operation, may best be understood by reference to the detailed description which follows taken in conjunction with the accompanying drawings in which:

FIG. 1, illustrates a preferred embodiment of this invention.

FIG. 2, illustrates a prior art method of marking of objects or part.

FIG. 3, illustrates a part or an object marked by the inventive method and apparatus of this invention.

FIG. 4, illustrates a more detailed view of a part or an object marked by the inventive method and apparatus of this invention.

DETAILED DESCRIPTION OF THE INVENTION

This invention allows for permanent markings on a wide variety of materials. The mark produced is clean and is clearly visible through a naked eye. Basically, a laser beam is used to directly mark or "engrave" the surface of the object or work-piece.

FIG. 1, illustrates a preferred embodiment of this invention. A work-piece or part or object 10, to be marked or engraved or coded, is placed underneath a transfer lens system 20. A laser beam 25, is sent through a mask 30, a wobble plate 23, to the transfer lens 20. The wobble plate 23, wobbles the laser beam 25, and a wobbled laser beam 35, hits the part 10. The wobbled laser beam 35, creates a bowl shaped indent or a micro-reflector 15, in the part 10.

FIG. 2, illustrates a prior art method of marking of objects or part. In the prior art method typically a laser beam is made to impinge on a part 11, and the laser beam makes a blind hole or an indent 16. The indent 16, has sharp or straight edges, and therefore, the light does not fully reflect from base 17, and side-walls 18, of the indent 16.

As more clearly seen in FIGS. 3 and 4, the part or the object 10, marked by the inventive method and apparatus of this invention, has a bowl shaped indent or a micro-reflector 15. The micro-reflector 15, allows the light to be reflected at all different angles and therefore the micro-reflector 15, is extremely visible to a naked eye. This visibility due to reflection of the light is over a wide range of angles and therefore, marking on part that are normally not visible become clearly visible with the marking of the part using a wobbled laser beam. Basically, for the area marked to be clearly seen through a naked eye the micro-reflectors 15, are formed in arrays of tiny "parabolic" or "cup-shaped" reflectors. Therefore, the image on the mask 30, that needs to be transferred onto the object 10, should comprise of an array of micro-reflectors 15.

The wobble plate 23, can also be used to defocus the laser beam 25. The distance between the wobble plate 23, and the object or workpiece 10, can be adjusted so that a defocused image of the laser beam 25, appears on the surface of the object 10. The object 10, could also be tilted at an angle so that a defocused image appears on the surface of the object 10. This defocusing is another way to create at least one micro-reflector 15.

The mask 30, which is preferably a dielectric mask 30, has the code or mark already imaged on it. This allows the image of the code or the marking, such as, for example, part numbers or other personalized information, from the dielectric mask to be printed directly onto the surface of the object or part 10, in a single exposure, thus improving throughput. A preferable dielectric mask that can be used with this invention is a high energy laser mask disclosed in U.S. Pat. No. 4,923,772 (Kirch et al.), assigned to the assignee of the instant patent application and the disclosure of which is incorporated herein by reference.

This invention allows the use of any letter fonts as these fonts are created from small micro-reflective surfaces 15.

Optimal size of the micro-reflectors 15, is a function of the part or object material, and the viewing angles desired. For a typical application and a normal viewing angle, 22.5 micron reflectors at the mask level printed on a 40 microns pitch gives the optimal contrast. But, for a viewing angle of 45 degrees, 12.5 micron reflectors on a 20 micron pitch works best.

This inventive apparatus and process is very simple and therefore it can easily be integrated into the design of part-marking lasers. Basically, a mask stage should be added to the machine so that a single mask can be used to print all part numbers. The mask would have the desired fonts designed into it. The mask would be moved to the correct position to print each letter or number in the correct order by using a stepper job file. For customers desiring to print few part numbers, or long production runs of a single part number, masks should be purchased with the entire part number, and set-up so that the mark or code is printed onto the part in a single laser ablation process.

With the right combinations of illumination, viewing angle and material, bar codes can be printed using this process which would not require a light source to be part of the reader. This would be important in situations where extraneous light is not desirable. For the bar code application, one would use a mask to print the letters with a font of parallel lines to create a diffraction grating in the shape of the letters on the part.

For automobile parts, this is not as good a choice, since the optimal viewing angle will be much narrower than for the little reflectors. The reflector structure gives an optimal viewing angle of about ±35 degrees. However, the letters would be slightly brighter for the diffraction grating letters. This structure would be preferred in bar code applications where the viewing angle and direction of illumination can be fixed.

This invention would be ideal for application in industries where paints and solvents cannot be used to identify the parts. However, the marked parts would still retain the high contrast typical of paints.

This process and apparatus is of special interest, particularly to those parts where the parts to be coded are light colored or metallic. The reason being that the higher the reflectivity of the surface of the part the more visible the mark will be. In some cases this could be done or verified by experimentation to get the optimum contrast.

This invention allows the easy marking of an object or work-piece with personalized information, such as, for example, insignia, brand name, logo mark, personalized signatures, date or date codes, batch codes, words, numbers, phrases, trademarks, and the like.

This invention can also be used to place marking on masks, such as, metal or non-metallic masks. One such mask has been disclosed in U.S. patent application Ser. No. 08/410,030, entitled "Single Metal Mask For Laser Ablation", filed on Mar. 24, 1995, now abandoned which is presently assigned to the assignee of the instant Patent Application and the disclosure of which is incorporated herein by reference.

The wobble plate 23, should be able to rotate at a speed of between about 0 revolution per minute and about 5,000 revolutions per minute. The preferable rotational speed for the wobble plate 23, is at least about 500 revolutions per minute.

The average depth of the micro-reflectors 15, is preferably between about 1 micron to about 100 microns, and more preferably about 15 microns.

The objects 10, to be marked with at least one micro-reflector 15, could be selected from a group consisting of semiconductor chips, ceramic materials, plastic materials and metallic materials.

EXAMPLE

The following example is intended to further illustrate the invention and is not intended to limit the scope of the invention in any manner.

Example 1

Using the apparatus as illustrated in FIG. 1, a laser beam process was used to ablate the part. A laser beam 25, having an area of about 0.7 cm by about 1.5 cm at 308 nm wavelength was used. The wobble plate 23, that was used had an angular velocity of about 769 RPM and an angle of about 1.4 degrees. Fluence used was 190 mJ/CM$^2$ at a repetition rate of 300 Hz. A total of 250 pulses were used.

For a normal viewing angle, 22.5 micron reflectors at the mask level printed on a 40 microns pitch were obtained, which gave the optimal contrast.

However, for a viewing angle of 45 degrees, 12.5 micron reflectors on a 20 micron pitch were found to work the best.

For different materials, a laser beam having a 248 nm wavelength, 193 nm wavelength, 351 nm wavelength, or other wavelength with differing settings could be used to obtain the micro-reflector structure 15.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A process for forming micro-reflectors on an object, comprising the steps of:
   (a) placing said object proximate to a transfer lens system,
   (b) shining a beam of laser light through a mask, and a wobble plate onto said object through said transfer lens system,
   (c) said wobble plate wobbling said beam of laser light such that a parabolic shaped micro-reflector is formed on said object, and thereby forming said micro-reflectors on said object.

2. The process of claim 1, wherein said wobble plate defocuses said laser beam.

3. The process of claim 2, wherein distance between said wobble plate and said object is adjusted so that a defocused image of said laser beam appears on surface of said object.

4. The process of claim 1, wherein said object is tilted at an angle so that a defocused image appears on surface of said object.

5. The process of claim 1, wherein said laser beam has a wavelength selected from a group consisting of 193 nm, 248 nm, 308 nm and 351 nm.

6. The process of claim 1, further comprising the step of scanning said micro-reflectors on surface of said object with a bar code reader.

7. The process of claim 1, further comprising the step of rotating said wobble plate at a speed of at least about 500 revolutions per minute.

8. The process of claim 1, further comprising the step of rotating said wobble plate at a speed of between about 0 revolution per minute and about 5,000 revolutions per minute.

9. The process of claim 1, wherein average depth of said micro-reflectors is between about 1 micron to about 100 microns.

10. The process of claim 1, wherein said object to be marked with said micro-reflector is selected from a group consisting of semiconductor chips, ceramic materials, plastic materials and metallic materials.

11. The process of claim 1, wherein said micro-reflectors form an image and wherein said image is selected from a group consisting of insignia, brand name, logo mark, personalized signature, date, date code, batch code, word, number, phrase and trademark.

12. The process of claim 1, wherein average depth of said micro-reflectors is about 15 microns.

* * * * *